United States Patent [19]
Marsh et al.

[11] Patent Number: 5,999,167
[45] Date of Patent: Dec. 7, 1999

[54] CURSOR CONTROL DEVICE

[75] Inventors: Stephen A. Marsh, 1354 Curve St., Carlisle, Mass. 01741; Frederick William Searles, Lexington, Mass.

[73] Assignee: Stephen A. Marsh, Carlisle, Mass.

[21] Appl. No.: 08/746,445

[22] Filed: Nov. 8, 1996

[51] Int. Cl.⁶ .................................................. G09G 5/08
[52] U.S. Cl. ...................... 345/158; 345/166; 345/169; 348/734
[58] Field of Search ................................. 345/158, 163, 345/157, 169, 166, 156, 146; 348/734; 463/37, 39; 340/825.19; 359/146, 139.06, 139.07; 356/152.1

[56] References Cited

U.S. PATENT DOCUMENTS

| | | | |
|---|---|---|---|
| 4,682,159 | 7/1987 | Davison | 340/709 |
| 4,745,402 | 5/1988 | Auerbach | 340/709 |
| 4,758,691 | 7/1988 | DeBruyne | 178/19 |
| 4,796,019 | 1/1989 | Auerbach | 345/158 |
| 4,988,981 | 1/1991 | Zimmerman et al. | 345/156 |
| 5,045,843 | 9/1991 | Hansen | 340/709 |
| 5,126,513 | 6/1992 | Wang et al. | 345/158 |
| 5,239,139 | 8/1993 | Zuta | 178/18 |
| 5,296,871 | 3/1994 | Paley | 345/163 |
| 5,359,348 | 10/1994 | Pilcher et al. | 345/158 |
| 5,554,980 | 9/1996 | Hashimoto et al. | 345/158 |
| 5,574,479 | 11/1996 | Odell | 345/158 |
| 5,602,597 | 2/1997 | Bertram | 347/734 |
| 5,703,623 | 12/1997 | Hall et al. | 345/158 |

OTHER PUBLICATIONS

Williams, Stephanie, "TV Goes to the Net," *TV Guide*, pp. 42–45, Nov. 9, 1996.

"Now Everyone Can Experience the Internet," *Popular Science* advertising insert by Sony Electronics Inc., Nov. 1996.

"Stereographics and Logitech in OEM Pact for 3D Virtual Reality Products—PMT," News Release of Apr. 12, 1993 on PTS New Product Announcements, p. 1.

"Introducing Magnavox WebTV," http://www.magnavox.com/hottechnology/webtv/webtv.html, downloaded Aug. 5, 1996.

"WebTV Product," http://www.webtv.net/HTML/home.product.html, downloaded Aug. 5, 1996.

"Press Release," http://www.webtv.net/HTML/home.license.html, downloaded Aug. 5, 1996.

"Infrared remote keyboard and mouse for Macintosh," http://embed.com/adb.html, downloaded Aug. 5, 1996.

"About WebTV,"http://www.webtv.net/HTML/home.about.html, downloaded Aug. 5, 1996.

*Primary Examiner*—Lun-Yi Lao
*Attorney, Agent, or Firm*—Hamilton, Brook & Smith & Reynolds, P.C.

[57] ABSTRACT

The present invention provides a cursor control device for use in three dimensional space. The cursor control device is based on point and click technology such that a user points a remote member of the cursor control device to a television assembly and depresses appropriate keys for corresponding functions. In particular, a mouse key on the remote member enables control of cursor movement functioning of a cursor displayed through the television assembly. A base unit portion of the present invention device is coupled to or interfaced with the television assembly. The base unit provides an ultrasound source for use of ultrasound by the remote member for determining positioning angular orientation of the remote member in three dimensional space. The base unit includes an infrared receiver for receiving infrared signals generated by an infrared transmitter at the remote member. Mouse commands and other commands from the remote member are communicated through infrared signals to the base unit.

16 Claims, 4 Drawing Sheets

A = AMPLIFIER STAGE  G = GAIN ADJUST STAGE
F = FILTER STAGE  C = COMPARATOR STAGE

CURSOR CONTROL DEVICE

BACKGROUND OF THE INVENTION

The information age has ushered in the necessity for new ways to examine, process, manage, access and control this information. As the basic technologies and equipment evolve to handle these new requirements, there will always be functions that are not properly addressed, either because they are subordinate to a more complex technology and therefore are not evident or because there seems to be some existing adequate way of performing the function.

The Internet and all it entails is the number one driving force behind many of the emerging technologies and products in electronic information. There is a constant race to provide simpler, more comfortable access to this huge phenomenon. One particularly interesting area is "Web-enabled-TVs", which will allow-consumers to "surf the net" from their living room couch through their television.

As the television consumer begins to experience the "Net", it is important to make this new experience as comfortable and easy as possible. There is a need for an appropriate interface for controlling the actions of a TV web user.

SUMMARY OF THE INVENTION

Most Internet application programs are optimized for use with a mouse, and PC/computer users have come to take for granted the ability to point and click their way through cyber space. Taking away this function substantially reduces the ease of use; the user is forced to push many keys to accomplish the same actions in a slower fashion. Applicants believe it is imperative not to penalize TV users by taking away their mouse just because they are sitting ten feet away from the output screen (i.e., TV) on their couch.

The present invention's wireless, remote point and click technology enables a user to merely point a television remote control unit at (i.e. in the direction of) the TV to move the cursor displayed on the TV. The user moves his hand to move the cursor to a desired position/location on the TV screen and clicks (i.e., depresses a key on the remote unit) to make a selection from the screen display. With this technology there is no reason to burden the consumer with pushing many keys on a remote unit just to move around and to select actions or items. The present invention allows the focus to be on the fun of the Internet experience, not on pushing a cursor around the screen.

Thus, effectively, the present invention combines a TV remote control and cursor control to provide a readily usable and somewhat familiar device to the television user. In the preferred embodiment, the cursor control device comprises:

a base unit adapted for coupling to a television assembly, the television assembly including at least one of a television, cable apparatus, set-top apparatus and applications programs, the base unit formed of (a) a controller for interfacing with the television assembly, and (b) an ultrasound transmitter coupled to the controller such that the controller controls an ultrasonic beacon emitted from the ultrasound transmitter, and one of the television assembly and the base unit including (c) an infrared sensor coupled to the controller, in response to infrared signals received by the infrared sensor, the controller providing cursor coordinate information to the television assembly; and a remote member adapted for portable use by a user to control the television assembly including control of movement of a cursor displayed through the television assembly, the remote member being formed of (i) an ultrasound receiver for receiving the ultrasonic beacon emitted from the ultrasound transmitter of the base unit, (ii) a positioning circuit coupled to receive from the ultrasound receiver an indication of positional angle of the received ultrasonic beacon, and therefrom the positioning circuit determining spatial position (angular position) of the remote member in three dimensional space by phase discrimination and correlation, (iii) an infrared transmitter responsive to the positioning circuit, the positioning circuit enabling the infrared transmitter to provide to the infrared sensor of the base unit, infrared signals indicative of the determined spatial position of the remote member, such that user movement of the remote member in three dimensional space is detected and determined by the remote member for controlling movement of a cursor as displayed through the television assembly.

In accordance with another aspect of the present invention, the remote member is hand held. In the preferred embodiment the remote member further includes a signal control coupled between the positioning circuit and infrared transmitter for controlling infrared signals transmitted from the infrared transmitter, and a mouse key coupled to the signal control. The mouse key enables generation of infrared signals to be transmitted from the infrared transmitter to the base unit to initiate control of movement of the cursor and to initiate display of the cursor through the television assembly.

Further in the preferred embodiment, the ultrasound receiver of the remote member is formed of an array of receivers for receiving the ultrasonic beacon emitted from the ultrasound transmitter of the base unit. The array of receivers includes at least two receiver elements on a first axis (horizontal axis) and at least two receiver elements on an orthogonal (vertical) axis. The receiver elements are coupled together in a manner such that phase angle of the electronic signal received by one receiver element of a pair relative to the other receiver element in the pair is able to be determined. Other array configurations are in the purview of one skilled in the art.

Alternatively, other working signals may be used instead of infrared signals between the base unit and the remote member. To that end other transmitters and receivers would then be used instead of the infrared ones of the preferred embodiment.

BRIEF DESCRIPTION OF THE DRAWINGS

The foregoing and other objects, features and advantages of the invention will be apparent from the following more particular description of preferred embodiments and the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

The present invention cursor control device/system is formed of hardware circuitry and software. The system is divided into a base unit 11 and a remote unit 21. The base unit 11 is most likely incorporated into (for maximum cost effectiveness) a TV, cable box or some other type of set-top-box. However, it may reside in a stand-alone unit which interfaces with the above-mentioned items of a television assembly. The remote unit or transponder 21 may well replace the current TV remote control device (as now known), since it can perform those functions along with the new point and click mouse features. And like the base unit 11, the remote unit/transponder 21 may (alternatively) be packaged into a separate (stand-alone) unit as well.

Figure 1:
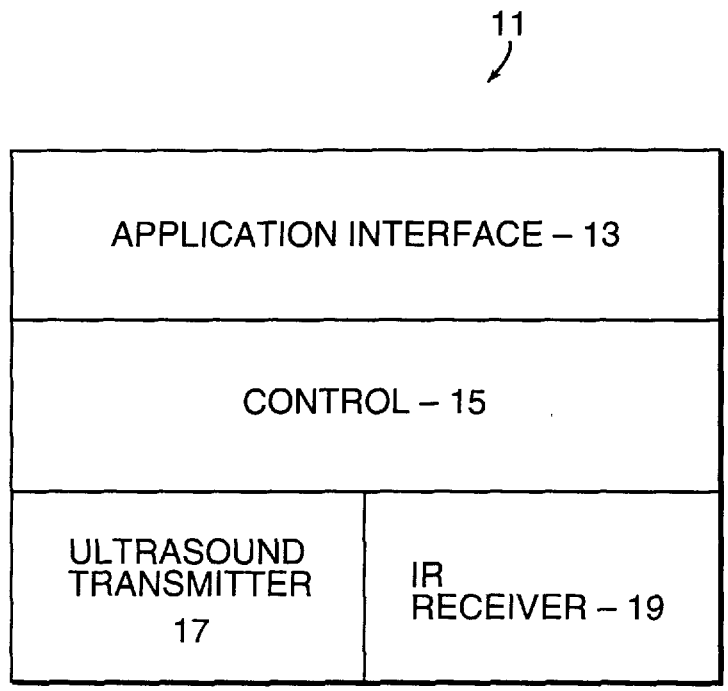
FIG. 1 is a block diagram of a base unit portion of the present invention cursor control system.

We will now describe the functional blocks of the system, starting with the base unit 11. As illustrated in FIG. 1, the base unit 11 is formed of (a) an application interface 13 (at the TV end of the base unit), (b) a control 15, (c) an ultrasound transmitter 17 and (d) an IR (infrared) receiver 19, the latter two being at the end of the base unit 11 facing the user.

The application interface 13 conveys the cursor coordinate (i.e., screen location) information, as well as the mouse key 29 (described below) status to the applications (e.g., TV, cable box or some other type of set-top-box). This information is formatted to be compatible with the existing software/hardware design that is responsible for moving the cursor on the TV screen. Alternatively the coordinate information may be integrated on the platform level to perform the cursor movement function directly. All special interface circuitry is also contained within this functional block (application interface) 13.

The control 15 is responsible for interpreting the special "mouse" commands from the IR signals received by IR receiver 19. In addition, controller 15 controls the state of the ultrasound point source beacon emitted from the ultrasound transmitter 17. In the preferred embodiment, the control 15 is a single chip microcontroller and contains all of the processing, control and memory requirements of the base unit 11. The control 15 may be customized for special system configurations.

The IR receiver 19 provides the input for the remote transponder's 21 mouse functions. In addition, IR receiver 19 may be used as the receiver of the standard TV remote IR commands. Conversely, the standard IR receiver in the TV, cable box or some other type of set-top-box may alternatively be used to provide the IR link from the present invention remote transponder 21 to the base unit 11. One or the other approach will work, eliminating the need for two separate IR receiver circuits and the expense of that redundancy.

The ultrasound transmitter 17 provides the point source signal which s used by the remote transponder 21 to determine its spatial (and in particular angular) orientation. The ultrasound transmitter 17 is activated by the local controller 15 when mouse functions are initiated at the remote transponder 21 through a mouse key 29 (described below). The ultrasound transmitter 17 may alternatively be built into the TV, cable box or some other type of set-top-box or into a stand alone unit. Again, the partitioning of the present invention elements and circuits from the TV, cable box or some other type of set-top-box is driven by the applications requirements and, of course, cost considerations.

Figure 2:
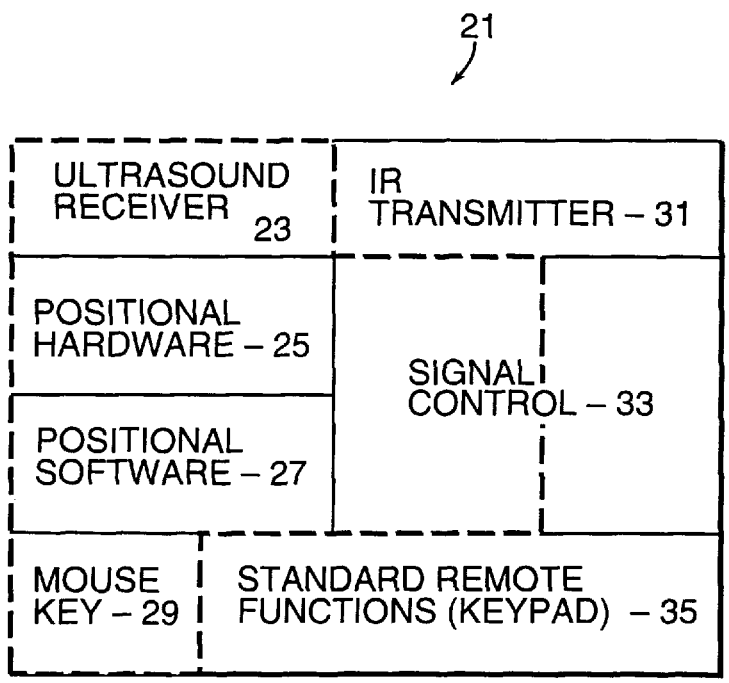
FIG. 2 is a block diagram of a remote member portion of the present invention.

The remote transponder 21 is the actual hand held "point and click" device. As can be seen in FIG. 2, the circuits inside of the dotted line make up the pointing mouse functions. The additional functions are those of a standard remote IR controller device (i.e., standard TV remote control) and need not be discussed here. We will now describe the remote transponder 21 circuits of FIG. 2.

Figure 4:
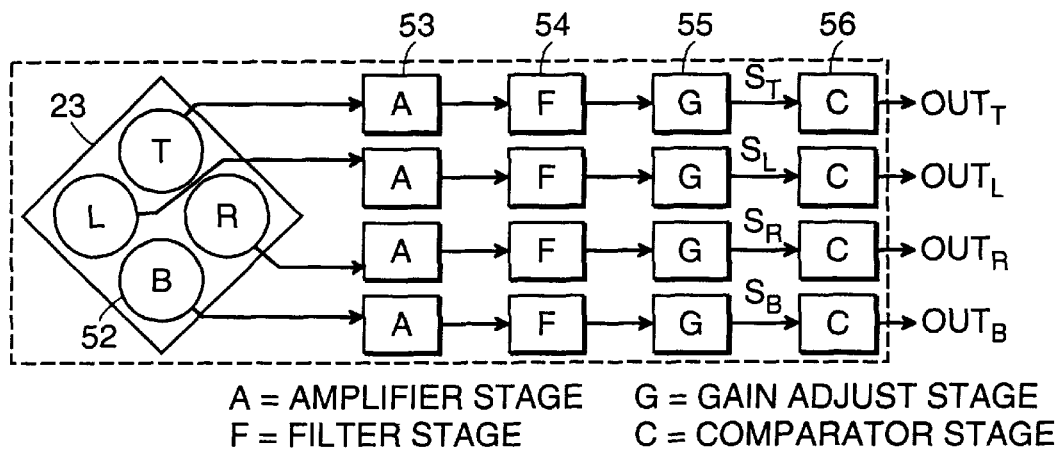
FIG. 4 is a schematic of an ultrasound receiver together with a portion of the positional hardware incorporated in the remote member portion of the present invention.

An ultrasound receiver 23 consists of an array of ultrasound receiving elements responsible for receiving the beacon soundwave emitted from the ultrasound transmitter 17 at the base unit 11 (FIG. 1). FIG. 4 shows an example of such an array 23 of ultrasound receiving elements 52, together with those portions (amplifier stages 53, filter stages 54, gain adjust stages 55, comparator stages 56) of the positional hardware 25 responsible for modifying the low-amplitude analog signals from the array element outputs to amplitudes suitable for use by the rest of the positional hardware 25. The use of appropriately spaced multiple ultrasound receiving elements 52 allows for the determination of the instantaneous signal phase angle of a single receiver element relative to the other three. The spatial orientation of the receiver array is then determined by processing the phase angle information corresponding to the receiver elements or sensors. In turn, dynamic phase discrimination and correlation are used to determine the relative changes in the spatial orientation of the hand held remote transponder member 21.

The receiver array 23 shown in FIG. 4 consists of four such sensors 52, designated as L (left) and R (right), corresponding to a horizontal or X-axis, and T (top) and B (bottom), corresponding to a vertical or Y-axis. The resulting conditioned analog signals are designated $S_L$, $S_R$, $S_T$ and $S_B$, respectively.

FIGS. 5a–5f illustrate how, preferably, left-right rotation of the array, that is, rotation about the vertical Y-axis, is determined by comparing the $S_L$ and $S_R$ signals, while up-down rotation of the array, that is, rotation about the horizontal X-axis, is determined by comparing the $S_T$ and $S_B$ signals.

Figure 5A:
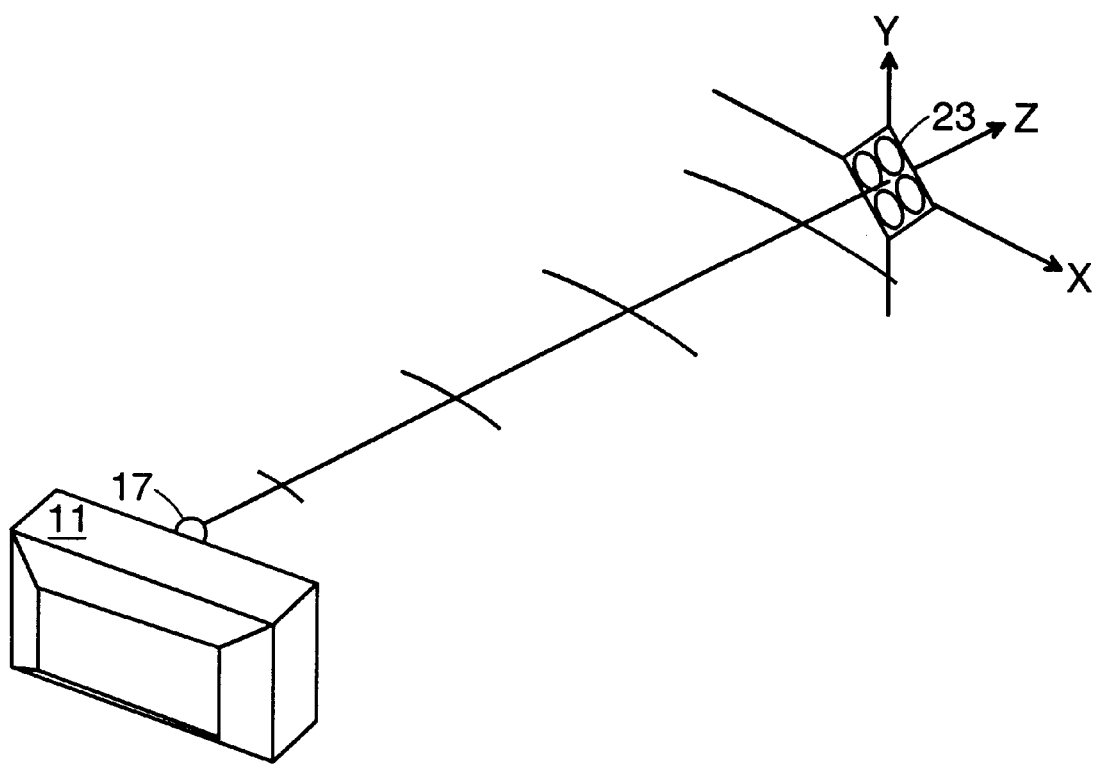
FIGS. 5a–5h illustrate the relative position of the ultrasound receiver to the beacon and the relationship in the present invention, of the ultrasound receiver array spatial orientation to the received ultrasound wavefronts and the corresponding phase delays of the receiver signal outputs.

FIG. 5a shows the receiver array 23 at some working location with respect to the ultrasound transmitter 17 on the base unit 11. To aid in the following discussion, a reference XYZ orthogonal coordinate system is defined with respect to the center of the receiver array 23 such that a line from the ultrasound transmitter 17 to the center of the receiver array forms the Z-axis. A reference array orientation can then be defined wherein the receiver array 23 lies in the XY-plane.

Figure 5C:
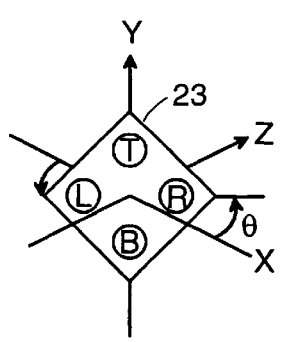
Figure 5B:
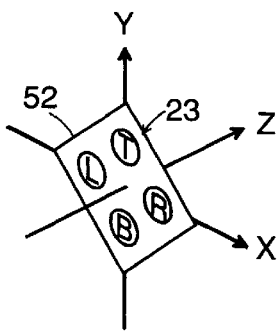

FIG. 5b illustrates the case in which the ultrasound receiving elements 52 designated L and R are aligned with the reference X-axis and those elements designated T and B are aligned with the reference Y-axis. In this reference position the signals $S_L$, $S_R$, $S_T$, and $S_B$ are all in phase since the four receiving array elements 52 are all equidistant from the ultrasound transmitter 17 and therefore must be receiving identically phased ultrasound waves from the transmitter.

In FIG. 5c, the receiver array 23 has been rotated about the Y-axis by an angle $\ominus$ from the reference position of FIG. 5b. As a result of this rotation, the ultrasound wavefront reaches element L sooner and element R later with respect to the corresponding arrival times at the receiver array reference position of FIG. 5b.

Figure 5F:
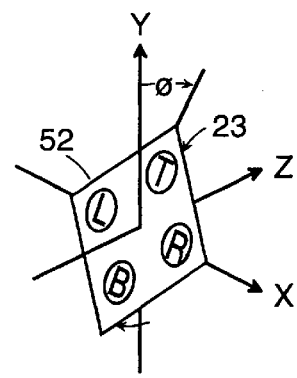
Figure 5D:
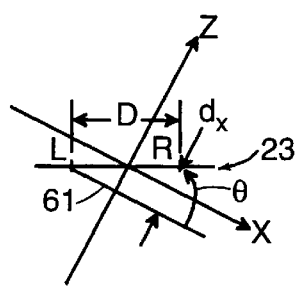

FIG. 5d is a view looking down at the system of FIG. 5c. From this vantage above the receiver array, the array 23 is viewed edgewise and the geometrical relationship caused by the rotation can be seen. A beacon signal wavefront 61 first arrives at element L, and then must travel an additional distance $d_x$ to element R. If D is the center-to-center spacing from L to R, then $$d_x = D \sin \Theta.$$

If the ultrasound wavelength is W, the phase difference between $S_L$ and $S_R$ is $$x\text{-Phase-diff} = (360D \sin \Theta)/W.$$

Figure 5G:
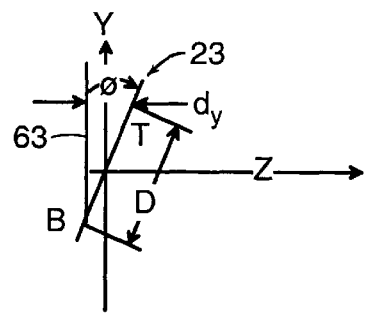
Figure 5E:
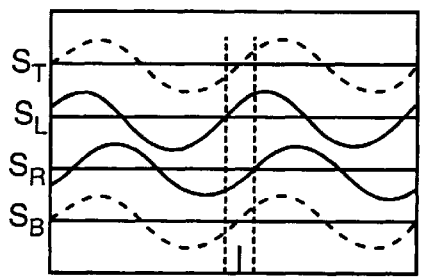

FIG. 5e illustrates that the corresponding signal $S_L$ is advanced in phase while $S_R$ is retarded. Note that signals $S_T$ and $S_B$ are in phase, since the receive elements T and B remain in the reference position along the Y-axis.

Figure 5H:
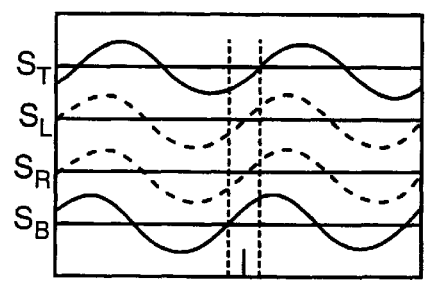

FIGS. 5f, 5g, and 5h parallel the three subfigure just discussed, FIG. 5f showing a rotation ø about the X-axis which would cause $S_T$ to retard in phase and $S_B$ to advance in phase, FIG. 5g shows the geometric projection on the YZ-plane leading to $$y\text{-Phase-diff} = (360D \sin \phi)/W$$

for a wavefront 63, and FIG. 5h shows $S_T$ retarded, $S_B$ advanced and $S_L$ and $S_R$ unchanged from the reference position.

It is evident that the phase information of interest is totally contained in the zero crossing of the waveforms. Comparators 56 shown in FIG. 4 provide suitable digital signals containing this zero-crossing information. It is also evident that this phase relationship is indicative of positional (angular) orientation with respect to the point source transmitter 17 of the ultrasound. The sensor axis pair is repeated in at least two different axes; an X axis and a Y axis with respect to the point source transmitter 17 of the ultrasound. The X axis represents, for example, the movements of the remote member 21 in a left/right direction while the Y axis represents the movements of the remote member 21 in an up/down direction.

Restated, using one sensor (of ultrasound receiver 23) on an axis as a reference, the positioning circuitry 25,27 (detailed below) determines the time difference and therefore the phase difference between the signal zero crossings of that sensor/receiver element and the other sensor on that axis. The interpretation of the resulting phase relationship represents a specific angular orientation to the point source transmitter 17 of the ultrasound. From the changes of phase relationship on both axes, a direction of travel and change of position (angular orientation) for the hand held remote unit 21 are determinable.

The ultrasound receiver 23 array in the preferred embodiment is made from a piezoelectric film material. This material has been chosen because of its abilities as a receiver of high ultrasonic frequencies, its ability to be produced in custom shapes and, of course, its low cost. In particular, the piezoelectric film produces an electrical signal in response to the ultrasonic air waves that hit it. This signal is small in amplitude and must be amplified to a greater level for further evaluation. It may be necessary for the receiving/processing circuits 25,27 to adjust the gain of the received signal so as to maintain a signal level above a preset threshold. This is necessary to maintain a good signal to noise ratio. The signal is also filtered to limit the system's response to the frequencies of interest. This also improves the signal to noise ratio. There are consequently status indications from these circuits 25, which are passed on to the processor circuitry 33 to provide a status of the received signal's quality.

Continuing with FIG. 2, the positional hardware circuitry 25 is responsible for amplification, gain control, filtering and producing phase relationship information. The outputs from this circuitry 25 are the "raw" information which the positional software 27 processes.

The positional software 27 employs algorithms that are responsible for interpretation, correlation and enhancements (e.g., smoothing). The results of these operations are fed to the signal control 33 for further processing. In particular, positional hardware and software circuitry 25,27 process information of change in spatical position including angular orientation of remote member 21. The positional hardware and software circuitry 25,27 may change sensitivity thresholds, rate of change thresholds and other various filtering or performance-affecting thresholds. After processing, the positional information must be encoded into some reduced format in order to reduce the transmission time back to the base unit 11. This is important so as to reduce the respective power consumption and to prolong the life of the hand-held unit's 21 batteries. Information reduction or encoding may include change only vectors, direction and magnitude or some other action-encoded response. The information transmission time must be less than the user's reaction time so that the operation of the system will appear to be instantaneous.

To that end, signal control 33 is responsible for formatting the positional information (from positional hardware and software circuits 25, 27) for IR transmission back to the base unit 11. Alternatively, the phase relationship information of positional hardware circuit 25 may be processed at base unit 11 to form an indication spacial position (angular orientation) of remote member 21. In that case, positioned software 27 provides, for example, positional change information only, or incremental information, or the like, and signal control 33 formats the provided information appropriately for transmission to base unit 11 via transmitter 31.

To that end, various levels of processing phase relation information to form spatial position (i.e. angular orientation) information, by remote unit 21 positional hardware and software circuits 25,27 are suitable as in the purview of one skilled in the art. As such, signal control 33 formats and enables transmission of appropriate data according to the level of processing done by remote unit 21 and that left for base unit 11.

In addition, signal control 33 handles the "mouse" key 29 and orchestrates the entire positional function and dialog between the remote member 21 and the base unit 11.

The mouse key(s) 29 are used to initiate the point and click function, as well as provide for standard mouse key closure.

The present invention system is capable of two way communications which permit dynamic adjustments, should the environment so require. For example, with the system's ability to monitor the status of the received signals (as previously discussed) and its ability to communicate to the base unit 11 where the point source transmitter 17 of the ultrasound resides, there is the capability of adjusting the response of the system. If for example, the signal levels of the sensors (of ultrasound receiver 23) falls below a predefined level, the hand-held unit 21 may send a command to the base unit 11 to tell it to increase the output drive power. Or the hand-held unit 21 could tell the base unit 11 to change the operating frequency to possibly remove standing wave cancellations at the hand-held unit's sensor 23 location. If two ultrasound point source transmitters 17 are employed, then the base unit 11 may be told to change the phase relationship between the transmitters 17 to effect a change in the direction of the peak output energy (i.e, that energy that is in phase and therefore reinforcing). Such beam steering would greatly increase the robustness of the system.

The essentials of an adaptive system require this ability to assess, make changes and reassess. The system is also capable of receiving data from the base unit 11 through the modulation of the point source transmitter 17 of the ultrasound. It may be an advantage of such a system to receive information from the base unit 11 and to store that information in the hand held remote member 21. Such information may affect the performance of the point and click system, as well as pertain to user information on an application level.

In addition, since the speed of sound waves in air is known, the system may be used to determine the distance of the hand held remote unit 21 from the point source transmitter 17 of the ultrasound. This may be accomplished by measuring the time between sending the enable mouse function command and the subsequent receipt of the ultrasound signal. The distance may be computed from this delay. Alternately, appropriate modulation of the ultrasound transmitter 17 may be used to accomplish a distance determination. The hand held remote unit 21 may then send the distance value back to the base unit 11 for use by the TV application. For example, the distance information may allow the application to adjust the size of the objects or text to be viewed (at the calculated/determined distance). The application could adjust the sound level or where the sound is focused, etc.

The present invention system operates within a field of view of 120 degrees or more and accommodates distances of up to 10 meters (between base unit 11 and remote member 21) in a preferred embodiment.

Figure 3:
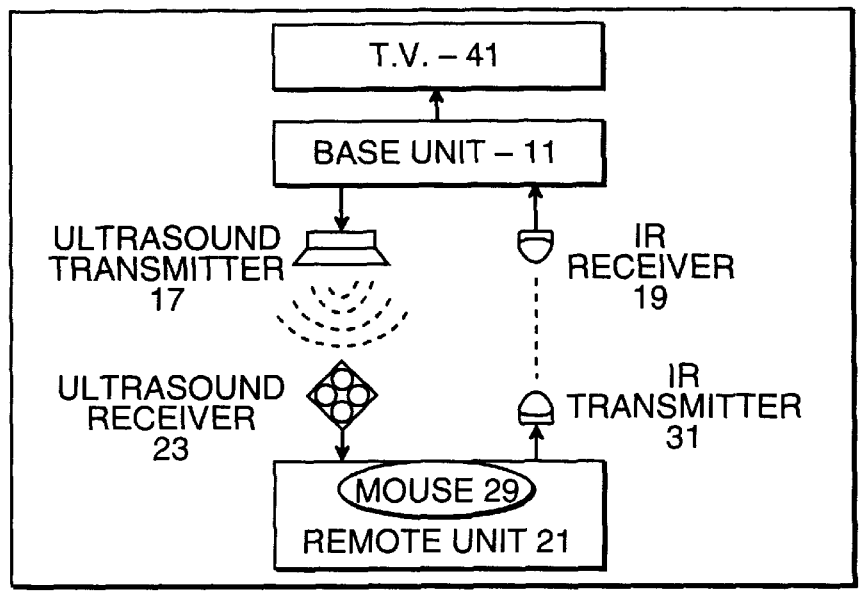
FIG. 3 is a schematic overview of the cursor control system of the present invention employing the base unit and remote member of FIGS. 1 and 2.

We will now describe the present invention system operation while referring to FIG. 3.

When the user wants to move a cursor displayed on the TV screen, he presses, lightly, on the mouse button 29 of the remote member 21. This action causes signal control 33 to generate a "mouse activation" command to be sent to the base unit 11 via the IR transmitter 31. When the base unit 11 (through IR receiver 19) receives this command, it turns on the ultrasound transmitter 17 beacon and makes the cursor visible on the TV 41 screen.

While the user continuously depresses mouse button 29, the remote member 21 enables the position analysis subsystem (23, 25, 27). This begins with the reception of the transmitted ultrasound signal by the ultrasound receiver circuit 23. The remote member 21 hardware and software circuits 25, 27 process these signals to determine a reference location and orientation, in three dimensional space, of remote member 21. This positional information is then converted (by signal control 33) into the proper format for transmission back to the base unit 11 via the IR transmitter 31. Subsequent horizontal or vertical angular changes in position of the remote member 21 in three dimensional space then result in corresponding changes in cursor location on the TV 41 screen.

The "click" (or selection) feature is accomplished by the user pressing harder on the mouse button 29. This key status information is transmitted (by signal control 33) back to the base unit 11 via the IR transmitter 31.

When cursor movement is no longer needed or desired, the user simply releases the mouse button 29. The cursor remains displayed stationary for a delay period and then becomes invisible. The release of the mouse button 29 also issues a "deactivation" command to base unit 11 control 15, which turns off the ultrasound transmitter 17 in the base unit 11. This limits the transmissions from the ultrasound transmitter 17 to being on only during the time the mouse function is in use.

Being able to "point and click" one's way around the Internet is a systems advantage, one that is much simpler than joy sticks, track balls and keyboards. Since Internet access to the home consumer is new, its (WebTV's) success will be tied in part to the equipment being used. Therefore, it is critical that this equipment be easy and comfortable to use.

Restated, applicants believe that the "point and click" feature will be crucial to the success of any WebTV system. Further, low cost will make a particular "point and click" technology successful. The present invention "point and click" technology is one of the most cost effective ways to implement this function with the required performance. As the cost/performance of infrared light control quickly allowed it to become the standard of wireless remotes on almost all commercial consumer products, so will the present invention technology become the standard of the "point and click" cursor control devices.

Since the present invention technology includes the standard components of the existing TV IR remote control device, it makes sense to incorporate those existing features into new class of remote controllers. Applicants would not be surprised if all of the next generation of controllers employ some sort of "point and click" technology. The question is, and has always been, at what cost and with what performance.

Equivalents

While the invention has been particularly shown and described with reference to a preferred embodiment thereof, it will be understood by those skilled in the art that various changes in form and details may be made therein without departing from the spirit and scope of the invention as defined by the appended claims.

For example, the genesis of the present invention concept was the need for a "point and click" capability for Internet access via a "Web-enabled-TV". However, it is important to recognize that this technology extends to any functionality presented on the TV screen. Five years ago, one programmed a VCR by pushing tiny and somewhat inaccessible buttons. Today one calls up a menu on the TV screen and pushes buttons on the TV remote control to do the same—somewhat easier, but still cumbersome. With the present invention, one will be able to "point and click" his way easily and rapidly through a set of windows and icons displayed on a TV screen.

Consider also the program information presented by most cable TV companies. A user switches to the program information channel, finds that information for the channel he is interested in has just scrolled past, and has to wait three minutes for the information to appear again. Some companies are making available a "TV Guide for the day" on screen, which again one laboriously trudges through with various buttons on the TV remote control. Eventually such a guide will become commonplace, but will be much easier to navigate with "point and click" control of the present invention. The advent of satellite TV service brings with it access to 150 or more channels, making such program searching even more arduous with present remote technology.

A new technology called ADSL, which will provide 6 Mbps downlinks and 600 kbps uplinks to and from the home via ordinary telephone lines, has been recently standardized and is already undergoing demonstration tests in this country. And even faster technologies are on the horizon. Among other things, such communication capability provides the capability to send realtime video to the home from subscriber libraries which will make available several thousand films (a user sends his request for the particular movie which is then put on line for the user alone). Imagine trying to navigate through the menus for such a quantity of films by pushing buttons on a TV remote control. Contrast that scenario with one in which a user searches for films not only by title but additionally by category, director, actors, year of production, and so forth, using a set of nested windows, icons and on screen key words, all of which are simply navigated with the single "point and click" capability of the present invention.

For the home user, the ever increasing and ever more complex development of communications technology will manifest itself as more and more information becomes available within the home. A major portion of this will be media and TV interactive information accessed through the TV screen via some combination of nested or multilevel menus and/or windows. To manipulate and navigate through these menus and windows, the average home user will want an approach which embodies simplicity and does not require an advanced degree in engineering. Applicants are convinced that the present invention "point and click" remote cursor control device is simple, versatile and is the solution to the existing need.

As used herein, the terms "set-top" and "set-top-box" are meant to refer to applications/computer programs, hardware/software circuitry, video player/recorders, etc., used in conjunction with a television. The use of the term "three dimensional space" with respect to the remote member 21 refers to the use of a remote member in air without requiring by a working surface. Three dimensional space is meant to describe the use and handling of the remote member 21 of the present invention like that of a standard TV remote control. Contrarywise, three dimensional space is not a limitation on the processing of spatial coordinate position of the remote unit 21 where a two dimensional or other positioning coordinate system is suitable for indicating spatial position of the remote unit 21. The term "TV" includes other displays, output means, screens, monitors, etc. The terms "cursor movement" and "cursor control" include positioning of a cursor on an output screen (e.g., TV screen) and direction or otherwise change in position/screen location or appearance in display of the cursor.

The ultrasound receiver 23 may alternatively be configured of multiple arrays or each array may be designed with one or more receiver elements in geometries within the purview of one skilled in the art. The above description with reference to a preferred embodiment of FIG. 2 is by way of example and not limitation of the present invention.

Similarly the IR transmitter 31 of remote unit 21 (FIG. 2) and IR sensor 19 of base unit 11 (FIG. 1) may be transmitter (s) and receiver(s), respectively, of other signals such as soundwaves, other wavelength light waves, etc. The use of infrared signals in the foregoing description of the preferred embodiment is by way of example and not limitation, as appropriate alternative types of signals are understood by one skilled in the art to be suitable.

We claim:

1. A cursor control device comprising:
   a base unit adapted for coupling to a television assembly, the television assembly including at least one of an output display, a television, cable apparatus, set-top apparatus and applications programs, the base unit being formed of (a) a controller for interfacing with the television assembly, and (b) an ultrasound transmitter coupled to the controller, such that the controller controls an ultrasonic beacon signal emitted from the ultrasound transmitter, and one of the television assembly and the base unit employing (c) a sensor coupled to the controller, in response to working signals received by the sensor, the controller providing cursor coordinate information to the television assembly; and
   a remote member adapted for portable use by a user to control the television assembly including control of movement of a cursor displayed through the television assembly, the remote member being formed of (i) an ultrasound receiver array comprising a plurality of sensors spaced apart from each other for receiving the ultrasonic beacon signal emitted from the ultrasound transmitter of the base unit, (ii) a positioning circuit coupled to receive from the ultrasound receiver array an indication of a phase angle of the received beacon signal at each sensor relative to other sensors, and therefrom determining corresponding angular orientation of the remote member relative to the base unit, (iii) a transmitter responsive to the positioning circuit, the positioning circuit enabling the transmitter to provide to the sensor of the base unit, working signals comprising data corresponding to said angular orientation of the remote member as derived by the positioning circuit from the determined phase relationship, such that user movement which changes angular orientation of the remote member is detected and determined by the remote member for controlling movement of a cursor displayed through the television assembly.

2. A cursor control device as claimed in claim 1 wherein the remote member is hand held.

3. A cursor control device as claimed in claim 1 wherein the remote member further includes a signal control coupled between the positioning circuit and infrared transmitter for controlling infrared signals transmitted from the infrared transmitter; and
   a mouse key coupled to the signal control to transmit infrared signals from the infrared transmitter to the base unit to initiate control of movement of the cursor and to initiate display of the cursor through the television assembly.

4. A cursor control device as claimed in claim 1 wherein the array of receivers is formed of at least two receiver elements on a first axis and at least two receiver elements on an orthogonal axis, coupled together in a manner which enables determination of phase angle of the ultrasonic beacon signal received by one receiver element in a pair relative to the other receiver element in the pair.

5. A cursor control device as claimed in claim 1 wherein the sensor coupled to the controller of the base unit is an infrared sensor; and
   the transmitter of the remote member is an infrared transmitter for transmitting infrared signals as the working signals to the infrared sensor.

6. A cursor control device as claimed in claim 1 wherein the base unit and remote member further provide beam steering such that the controller of the base unit changes the phase at which the ultrasound transmitter emits the ultrasonic beacon.

7. A cursor control device as claimed in claim 1 wherein the base unit and remote member include adaptive circuitry such that the remote member monitors status of received ultrasound wave signals from the base unit, communicates to the base unit a desired change in operation of the base unit, and subsequent to the change being implemented by the base unit, reassesses status.

8. A cursor control device as claimed in claim 1 wherein the base unit and remote member further provide two-way communication including providing data sent from the base unit to the remote member to be stored therein for subsequent reference.

9. A cursor control device as claimed in claim 1 wherein the positioning circuit of the remote member employs phase discrimination and correlation of the received ultrasound wave signals to determine phase relationship and hence corresponding angular orientation of the remote member.

10. A cursor control device as claimed in claim 1 wherein the base unit transmits data to the remote member by modulating the ultrasonic beacon, and the remote member receives and stores said data for further processing.

11. A cursor control device as claimed in claim 1 wherein the distance from the base unit to the remote member is determined by measuring a period of time, beginning with sending an enable mouse function command from the remote member, said period of time including receiving said enable mouse function command at the base unit and transmitting a subsequent ultrasound signal from the base unit, and said period of time ending with receiving said subsequent ultrasound signal at the remote member.

12. A method of controlling movement of a cursor comprising the steps of:
   providing a television assembly including at least one of an output display, a television, cable apparatus, set-top apparatus and applications programs;
   coupling a base unit to the television assembly, the base unit being formed of (a) a controller for interfacing with the television assembly, and (b) an ultrasound transmitter coupled to the controller such that the controller controls an ultrasonic beacon signal emitted from the ultrasound transmitter, and one of the television assembly and the base unit including a sensor coupled to the controller, the controller providing cursor coordinate information to the television assembly in response to working signals received by the sensor;
   providing to the user of the television assembly, a portable hand-held remote member formed of (i) an ultrasound receiver array comprising a plurality of sensors spaced apart from each other for receiving the ultrasonic beacon signal emitted from the ultrasound transmitter of the base unit, (ii) a positioning circuit coupled to receive from the ultrasound receiver array an indication of a phase angle of the received beacon signal at each sensor relative to other sensors, and therefrom determining corresponding angular orientation of the remote member relative to the base unit, by phase discrimination and correlation, (iii) a transmitter responsive to the positioning circuit, the positioning circuit enabling the transmitter to provide to the sensor of the base unit, working signals comprising data indicative of angular orientation of the remote member as derived by the positioning circuit from the phase discrimination and correlation, such that user movement which changes angular orientation of the remote member is detected and determined by the remote member for controlling movement of a cursor displayed through the television assembly; and
   determining and detecting by the remote member, said user movement of the remote member such that the base unit is enabled to change position of a cursor displayed through the television assembly in a manner corresponding to user desired cursor movement.

13. A method as claimed in claim 12 wherein the remote member further includes (i) a signal control coupled between the positioning circuit and transmitter for controlling working signals transmitted from the transmitter; and
   (ii) a mouse key coupled to the signal control to transmit signals from the transmitter to the base unit to initiate control of movement of the cursor and to initiate display of the cursor through the television assembly; and
   before the step of determining and detecting user movement of the remote member, the method further includes the step of initiating display of the cursor through the television assembly and initiating control of movement of the cursor, by user operation of the mouse key.

14. In a television system with remote control comprising a handheld remote unit with an infrared transmitter for transmitting infrared signals carrying orientation information, and a television assembly, the television assembly including at least one of an output display, a television, cable apparatus, set-top apparatus and applications programs, the television assembly employing (i) an infrared receiver to receive infrared signals transmitted from the handheld remote unit, and (ii) a controller coupled to the infrared receiver to control the television assembly based on the received infrared signals including controlling channel and volume played through the television, the improvement comprising:
   an ultrasound transmitter coupled to the controller such that the controller controls an ultrasonic beacon signal emitted from the ultrasound transmitter;
   an ultrasound receiver array comprising a plurality of sensors located within the handheld remote unit and spaced apart from each other for receiving the ultrasonic beacon signal emitted from the ultrasound transmitter;
   a positioning circuit within the handheld remote unit coupled to receive from the ultrasound receiver array an indication of a phase angle of the received beacon signal at each sensor relative to other sensors and therefrom determining corresponding angular orientation of the remote unit relative to the television assembly, wherein the infrared transmitter, in addition to transmitting infrared signals for controlling channel and volume played through the television, is further responsive to the positioning circuit and provides to the infrared receiver employed by the television assembly, working signals comprising data corresponding to angular orientation of the remote unit as derived by the positioning circuit from the determined phase relationship, such that a change in said angular orientation of the handheld remote unit, and caused by angular user movement of the handheld remote unit is detected and determined by the remote unit for controlling movement of a cursor displayed through the television assembly.

15. A television system as in claim 14 further comprising a base unit formed of the controller and the ultrasound transmitter, the base unit adapted for coupling to the television assembly, and one of the television assembly and base unit having the infrared receiver.

16. A television system as in claim 14 wherein the handheld remote unit includes a depressible switch connected to the infrared transmitter, said depressible switch operating in a manner such that (a) when a user initially operates said depressible switch, a mouse activation command is sent to the infrared receiver and controller, said controller in response turning on the ultrasound transmitter and causing a cursor to become visible on at least the television, (b) while the user continuously operates said depressible switch, the cursor tracks movement of the hand-held remote unit, (c) when the user further operates the depressible switch, a select command is sent to the infrared receiver and controller, and (d) when the user releases the depressible switch, a deactivation command is sent to the infrared receiver and controller, the controller being responsive to the deactivation command, causing the cursor to disappear from view on the television and turning the ultrasound transmitter off.

* * * * *